US012051043B2

(12) United States Patent
Allison et al.

(10) Patent No.: US 12,051,043 B2
(45) Date of Patent: Jul. 30, 2024

(54) SYSTEMS, METHODS AND APPARATUS FOR FORM BUILDING

(71) Applicant: Zillow, Inc., Seattle, WA (US)

(72) Inventors: Gregory Austin Allison, Cincinnati, OH (US); Matthew Allan Vorst, Blue Ash, OH (US); Nandagopal Mysoro Jayaram, Mason, OH (US)

(73) Assignee: MFTB Holdco, Inc., Seattle, WA (US)

( * ) Notice: Subject to any disclaimer, the term of this patent is extended or adjusted under 35 U.S.C. 154(b) by 83 days.

(21) Appl. No.: 17/401,928

(22) Filed: Aug. 13, 2021

(65) Prior Publication Data

US 2021/0406830 A1 Dec. 30, 2021

Related U.S. Application Data

(63) Continuation of application No. 16/135,282, filed on Sep. 19, 2018, now Pat. No. 11,176,518, which is a continuation of application No. 13/547,120, filed on Jul. 12, 2012, now Pat. No. 10,108,928.

(60) Provisional application No. 61/548,281, filed on Oct. 18, 2011.

(51) Int. Cl.
*G06Q 10/10* (2023.01)
*G06F 40/174* (2020.01)

(52) U.S. Cl.
CPC ........... *G06Q 10/10* (2013.01); *G06F 40/174* (2020.01)

(58) Field of Classification Search
CPC .............................. G06F 40/174; G06Q 10/10
USPC ....................................................... 715/222
See application file for complete search history.

(56) References Cited

U.S. PATENT DOCUMENTS

| 4,747,093 | A | 5/1988 | Benne et al. |
| 4,870,576 | A | 9/1989 | Tornetta |
| 4,912,653 | A | 3/1990 | Wood |
| 5,032,989 | A | 7/1991 | Tornetta |
| D321,903 | S | 11/1991 | Chepaitis |
| 5,317,646 | A | 5/1994 | Sant et al. |
| 5,325,297 | A | 6/1994 | Bird et al. |
| 5,361,201 | A | 11/1994 | Jost |
| 5,392,388 | A | 2/1995 | Gibson |
| 5,465,308 | A | 11/1995 | Hutcheson |
| 5,526,341 | A | 6/1996 | Shiba et al. |
| 5,606,609 | A | 2/1997 | Houser et al. |
| 5,623,655 | A | 4/1997 | Chisaka |
| 5,636,117 | A | 6/1997 | Rothstein |
| 5,680,305 | A | 10/1997 | Apgar |

(Continued)

OTHER PUBLICATIONS

"E-Signature Custom Signature Fonts," http:/www.e-signature.com/en/prod01_en.htm, Mar. 28, 2006, 4pages.

(Continued)

*Primary Examiner* — Stephen S Hong
*Assistant Examiner* — Nicholas Hasty
(74) *Attorney, Agent, or Firm* — Perkins Coie LLP (57) ABSTRACT

Systems, methods and apparatus are provided for generating electronic transactional documents using a form generating system. The electronic transactional document may be created using a design tool that allows a user to place data entry fields over an image or snap shot of a transactional document. Rules, default values, and attributes associated with the date entry fields may be established as the electronic transactional document is being created.

20 Claims, 7 Drawing Sheets

(56) References Cited

U.S. PATENT DOCUMENTS

| | | |
|---|---|---|
| 5,754,850 A | 5/1998 | Janssen |
| D396,455 S | 7/1998 | Bier |
| 5,848,187 A | 12/1998 | Bricklin et al. |
| 5,943,679 A | 8/1999 | Niles |
| 5,946,667 A | 8/1999 | Tull |
| 6,032,123 A | 2/2000 | Jameson |
| 6,067,831 A | 5/2000 | Hoyt et al. |
| 6,289,460 B1 | 11/2001 | Hajmiragha |
| 6,314,415 B1 | 11/2001 | Mukherjee |
| 6,401,070 B1 | 6/2002 | McManus |
| 6,519,618 B1 | 2/2003 | Snyder |
| D474,197 S | 5/2003 | Nguyen |
| D477,242 S | 7/2003 | Laats |
| 6,594,633 B1 | 7/2003 | Broeman |
| 6,609,109 B1 | 8/2003 | Bradley |
| 6,609,118 B1 | 8/2003 | Khedkar |
| 6,636,803 B1 | 10/2003 | Hartz |
| 6,651,217 B1 | 11/2003 | Kennedy et al. |
| 6,684,196 B1 | 1/2004 | Mini et al. |
| 6,711,554 B1 | 3/2004 | Salzamann et al. |
| 6,810,404 B1 | 10/2004 | Ferguson et al. |
| 6,898,317 B2 | 5/2005 | Struble et al. |
| 6,920,455 B1 | 7/2005 | Weschcler |
| 6,944,648 B2 | 9/2005 | Dochran et al. |
| D521,019 S | 5/2006 | Ording |
| 7,143,290 B1 | 11/2006 | Ginter et al. |
| D536,343 S | 2/2007 | Fong et al. |
| D544,495 S | 6/2007 | Evans et al. |
| 7,228,319 B1 | 6/2007 | Fuchs |
| D554,660 S | 11/2007 | Hoover et al. |
| D554,661 S | 11/2007 | Hoover et al. |
| 7,296,001 B1 | 11/2007 | Ephrati |
| 7,299,408 B1 | 11/2007 | Daconta et al. |
| 7,334,187 B1 | 2/2008 | Stanciu |
| D566,722 S | 4/2008 | Jackson |
| 7,376,891 B2 * | 5/2008 | Hitchcock ............ G06F 40/174 715/224 |
| D572,726 S | 7/2008 | Guimaraes et al. |
| 7,475,333 B2 | 1/2009 | Otter et al. |
| D591,305 S | 4/2009 | Shimoda |
| 7,543,228 B2 | 6/2009 | Kelkar et al. |
| D595,727 S | 7/2009 | Koes et al. |
| D599,284 S | 9/2009 | Misumi |
| D599,814 S | 9/2009 | Ogura et al. |
| D601,159 S | 9/2009 | Truelove et al. |
| 7,692,635 B2 | 4/2010 | Iwamura |
| 7,702,999 B1 | 4/2010 | Sperr et al. |
| D615,551 S | 5/2010 | Arnell |
| 7,725,359 B1 | 5/2010 | Katzfey et al. |
| D619,593 S | 7/2010 | Fujioka et al. |
| 7,765,125 B1 | 7/2010 | An |
| D624,557 S | 9/2010 | Allen et al. |
| 7,818,219 B2 | 10/2010 | Klivington et al. |
| 7,822,691 B1 | 10/2010 | Kuo |
| 7,917,842 B2 | 3/2011 | Garrison |
| 7,945,496 B2 | 5/2011 | Trott |
| 7,970,684 B1 | 6/2011 | Benda |
| 7,987,117 B2 | 7/2011 | Mozley |
| D643,047 S | 8/2011 | Guss et al. |
| D644,243 S | 8/2011 | Matas |
| D644,654 S | 9/2011 | Maitlen et al. |
| D650,790 S | 12/2011 | Jeans et al. |
| D650,807 S | 12/2011 | Impas et al. |
| D652,426 S | 1/2012 | Anzures |
| D654,925 S | 2/2012 | Nishizawa et al. |
| 8,145,909 B1 | 3/2012 | Agrawal |
| D656,954 S | 4/2012 | Arnold et al. |
| 8,151,209 B2 | 4/2012 | Law et al. |
| D659,711 S | 5/2012 | Guss et al. |
| D660,317 S | 5/2012 | Jesberger |
| D664,205 S | 7/2012 | Xu et al. |
| D665,161 S | 8/2012 | Leifeld et al. |
| D665,162 S | 8/2012 | Leifeld et al. |
| D665,163 S | 8/2012 | Leifeld et al. |
| D665,421 S | 8/2012 | Morrow et al. |
| 8,239,496 B2 | 8/2012 | Peterson et al. |
| D667,429 S | 9/2012 | Wujcik et al. |
| D669,497 S | 10/2012 | Lee et al. |
| D669,499 S | 10/2012 | Gardner et al. |
| D671,558 S | 11/2012 | Anzures et al. |
| D676,060 S | 2/2013 | Frost et al. |
| D676,457 S | 2/2013 | Frost et al. |
| 8,375,016 B2 | 2/2013 | Allison |
| D677,180 S | 3/2013 | Plitkins et al. |
| D682,305 S | 5/2013 | Mierau et al. |
| D682,882 S | 5/2013 | Cahill et al. |
| D683,757 S | 6/2013 | Phelan |
| D684,185 S | 6/2013 | Van Dongen et al. |
| D684,990 S | 6/2013 | Walsh |
| D687,046 S | 7/2013 | Plitkins et al. |
| D687,057 S | 7/2013 | Plitkins |
| D687,460 S | 8/2013 | Tyler et al. |
| D687,851 S | 8/2013 | Sloo et al. |
| D689,505 S | 9/2013 | Convay et al. |
| D690,717 S | 10/2013 | Thomsen et al. |
| D690,718 S | 10/2013 | Thomsen et al. |
| D691,629 S | 10/2013 | Matas et al. |
| D692,444 S | 10/2013 | Lee et al. |
| 8,583,562 B1 | 11/2013 | McDaniel |
| 8,589,191 B1 | 11/2013 | Menzies |
| D696,265 S | 12/2013 | d'Amore et al. |
| D697,076 S | 1/2014 | Oda et al. |
| D697,518 S | 1/2014 | Thomsen et al. |
| D697,519 S | 1/2014 | Thomsen et al. |
| D697,935 S | 1/2014 | Lee et al. |
| D698,363 S | 1/2014 | Asai |
| D699,248 S | 2/2014 | Pearson et al. |
| D699,250 S | 2/2014 | Fuji et al. |
| D699,741 S | 2/2014 | Wantland et al. |
| D699,750 S | 2/2014 | Pearson et al. |
| D700,207 S | 2/2014 | Pearson et al. |
| 8,650,067 B1 | 2/2014 | Moss |
| 8,683,315 B2 | 3/2014 | Stover |
| D703,683 S | 4/2014 | Skidgel |
| D704,204 S | 5/2014 | Rydenhag |
| D705,263 S | 5/2014 | Hartley |
| D705,808 S | 5/2014 | Anzures et al. |
| D706,814 S | 6/2014 | Phelan |
| D707,705 S | 6/2014 | Folken et al. |
| D708,203 S | 7/2014 | Johnson |
| D708,221 S | 7/2014 | Danton et al. |
| D708,226 S | 7/2014 | Takata et al. |
| D709,917 S | 7/2014 | Faulkner et al. |
| D711,421 S | 8/2014 | Bautista |
| D715,313 S | 10/2014 | Hontz, Jr. |
| D715,322 S | 10/2014 | Sakata |
| D716,325 S | 10/2014 | Brudnicki |
| D717,334 S | 11/2014 | Sakuma |
| D717,335 S | 11/2014 | Sakuma |
| D717,681 S | 11/2014 | Shail et al. |
| D717,822 S | 11/2014 | Brotman et al. |
| D717,823 S | 11/2014 | Brotman et al. |
| D718,325 S | 11/2014 | Schoger et al. |
| D721,090 S | 1/2015 | Hong et al. |
| D721,093 S | 1/2015 | Pereira |
| 9,330,375 B2 | 5/2016 | Allison |
| 9,575,622 B1 | 2/2017 | Allison et al. |
| 9,785,627 B2 | 10/2017 | Campanelli et al. |
| 9,858,548 B2 | 1/2018 | Allison |
| 10,062,110 B1 | 8/2018 | Tatang |
| 10,108,928 B2 | 10/2018 | Allison |
| 10,552,525 B1 | 2/2020 | Allison |
| 10,733,364 B1 | 8/2020 | Allison |
| 10,826,951 B2 | 11/2020 | Allison |
| 11,176,518 B2 | 1/2021 | Allison |
| 10,976,885 B2 | 4/2021 | Allison |
| 11,258,837 B1 | 2/2022 | Allison |
| 11,393,057 B2 | 7/2022 | Allison |
| 11,621,983 B1 | 4/2023 | Allison |
| 2001/0039506 A1 | 11/2001 | Robbins |
| 2002/0035520 A1 | 3/2002 | Weiss |
| 2002/0065739 A1 | 5/2002 | Florance |
| 2002/0069358 A1 | 6/2002 | Silvester |
| 2002/0082849 A1 | 6/2002 | Tenorio |

(56) References Cited

U.S. PATENT DOCUMENTS

| | | |
|---|---|---|
| 2002/0087389 A1 | 7/2002 | Sklarz |
| 2002/0095570 A1 | 7/2002 | Eldridge |
| 2002/0099733 A1 | 7/2002 | Teruuchi et al. |
| 2002/0129056 A1 | 9/2002 | Conant et al. |
| 2002/0129656 A1 | 9/2002 | Conant et al. |
| 2002/0135440 A1 | 9/2002 | Ryhanen |
| 2002/0184485 A1 | 12/2002 | Dray, Jr. et al. |
| 2003/0046639 A1 | 3/2003 | Fai et al. |
| 2003/0056100 A1 | 3/2003 | Beatson |
| 2003/0101063 A1 | 5/2003 | Sexton |
| 2003/0121008 A1 | 6/2003 | Tischer |
| 2003/0191719 A1 | 10/2003 | Ginter et al. |
| 2003/0220807 A1 | 11/2003 | Hoffmna |
| 2003/0227482 A1 | 12/2003 | Bach et al. |
| 2003/0229552 A1 | 12/2003 | Lebaric |
| 2003/0236832 A1 | 12/2003 | McIntrye |
| 2004/0085355 A1 | 5/2004 | Harmes |
| 2004/0098284 A1 | 5/2004 | Petito et al. |
| 2004/0128215 A1 | 7/2004 | Florance |
| 2004/0133493 A1 | 7/2004 | Ford et al. |
| 2004/0181749 A1 | 9/2004 | Chellapilla |
| 2004/0205534 A1 | 10/2004 | Koelle |
| 2004/0205653 A1 | 10/2004 | Hadfield et al. |
| 2004/0220885 A1 | 11/2004 | Salzmann et al. |
| 2004/0225884 A1 | 11/2004 | Lorenzini et al. |
| 2004/0255114 A1 | 12/2004 | Lee et al. |
| 2005/0086596 A1 | 4/2005 | Koch et al. |
| 2005/0108025 A1 | 5/2005 | Cagan |
| 2005/0177389 A1 | 8/2005 | Rakowicz et al. |
| 2005/0192930 A1 | 9/2005 | Hightower et al. |
| 2005/0231746 A1 | 10/2005 | Parry |
| 2005/0251535 A1 | 11/2005 | Theissen et al. |
| 2005/0268217 A1* | 12/2005 | Garrison ............... G06F 40/174 707/999.001 |
| 2005/0273417 A1 | 12/2005 | Budish |
| 2005/0289114 A1* | 12/2005 | Bellamy ............... G06F 16/93 |
| 2006/0007189 A1 | 1/2006 | Gaines |
| 2006/0015435 A1 | 1/2006 | Nathanson |
| 2006/0026032 A1 | 2/2006 | Higgins |
| 2006/0026136 A1 | 2/2006 | Drucker et al. |
| 2006/0069599 A1 | 3/2006 | Hatoun |
| 2006/0085311 A1 | 4/2006 | Hoerle et al. |
| 2006/0116952 A1 | 6/2006 | Orfano |
| 2006/0149567 A1 | 7/2006 | Muller et al. |
| 2006/0161780 A1 | 7/2006 | Berryman et al. |
| 2006/0190810 A1 | 8/2006 | Piersol |
| 2006/0200308 A1 | 9/2006 | Arutunian |
| 2006/0259440 A1 | 11/2006 | Daryl et al. |
| 2006/0277123 A1 | 12/2006 | Kennedy et al. |
| 2007/0005383 A1 | 1/2007 | Kasower |
| 2007/0009158 A1 | 1/2007 | Geva et al. |
| 2007/0022141 A1 | 1/2007 | Singleton |
| 2007/0038533 A1 | 2/2007 | Huff |
| 2007/0088958 A1 | 4/2007 | Qa Im-mapami |
| 2007/0118391 A1 | 5/2007 | Malaney |
| 2007/0136361 A1 | 6/2007 | Jae et al. |
| 2007/0136679 A1 | 6/2007 | Yang |
| 2007/0168382 A1* | 7/2007 | Tillberg ............... G06F 16/5846 707/E17.084 |
| 2007/0179881 A1 | 8/2007 | Lord |
| 2007/0186157 A1 | 8/2007 | Walker |
| 2007/0198910 A1 | 8/2007 | Jensen et al. |
| 2007/0198952 A1 | 8/2007 | Pittenger et al. |
| 2007/0255625 A1 | 11/2007 | Katzen |
| 2007/0282788 A1 | 12/2007 | Lamb et al. |
| 2008/0091700 A1 | 4/2008 | Brotherson |
| 2008/0091954 A1 | 4/2008 | Morris et al. |
| 2008/0097777 A1 | 4/2008 | Rielo |
| 2008/0133319 A1 | 6/2008 | Adiga |
| 2008/0154740 A1 | 6/2008 | Lee et al. |
| 2008/0155391 A1 | 6/2008 | Sattler et al. |
| 2008/0167941 A1 | 7/2008 | Kagarlis |
| 2008/0209313 A1 | 8/2008 | Gonser |
| 2008/0260287 A1 | 10/2008 | Berryman et al. |
| 2008/0262833 A1 | 10/2008 | Kano et al. |
| 2008/0288312 A1 | 11/2008 | Miles |
| 2008/0301064 A1 | 12/2008 | Burns |
| 2008/0319890 A1 | 12/2008 | Urbanski |
| 2009/0003588 A1 | 1/2009 | Ross |
| 2009/0006241 A1 | 1/2009 | Zhao |
| 2009/0018975 A1 | 1/2009 | Geltner |
| 2009/0024912 A1 | 1/2009 | McCabe et al. |
| 2009/0025087 A1 | 1/2009 | Perison et al. |
| 2009/0043685 A1 | 2/2009 | Benjamin |
| 2009/0109455 A1 | 4/2009 | Smith et al. |
| 2009/0173552 A1 | 7/2009 | Elder et al. |
| 2009/0192862 A1 | 7/2009 | Hoggard |
| 2009/0226090 A1 | 9/2009 | Okita |
| 2009/0029786 A1 | 11/2009 | McCabe et al. |
| 2009/0313158 A1 | 12/2009 | Del Monte |
| 2009/0320035 A1 | 12/2009 | Ahlgren |
| 2010/0011286 A1 | 1/2010 | Isoda |
| 2010/0023379 A1 | 1/2010 | Rappaport |
| 2010/0057538 A1 | 3/2010 | Hardman |
| 2010/0076903 A1 | 3/2010 | Klingenberg |
| 2010/0131331 A1 | 5/2010 | Ginsburg |
| 2010/0161460 A1 | 6/2010 | Vroom et al. |
| 2010/0161498 A1 | 6/2010 | Walker |
| 2010/0235727 A1 | 9/2010 | Ashton et al. |
| 2010/0287260 A1 | 11/2010 | Peterson et al. |
| 2011/0026828 A1 | 2/2011 | Balasubramanian et al. |
| 2011/0178905 A1 | 7/2011 | Kagarlis |
| 2011/0199631 A1 | 8/2011 | Healy |
| 2011/0258535 A1 | 10/2011 | Alder et al. |
| 2011/0270766 A1 | 11/2011 | Ramakrishnan et al. |
| 2011/0271173 A1* | 11/2011 | Ait-Mokhtar ......... G06F 40/174 715/226 |
| 2011/0276395 A1 | 11/2011 | Gaton et al. |
| 2011/0276875 A1 | 11/2011 | McCabe et al. |
| 2011/0313945 A1 | 12/2011 | Callan |
| 2011/0314371 A1 | 12/2011 | Peterson et al. |
| 2012/0063684 A1 | 3/2012 | Denoue |
| 2012/0066061 A1 | 3/2012 | Clement |
| 2012/0096383 A1 | 4/2012 | Sakamoto et al. |
| 2012/0102002 A1 | 4/2012 | Sathyanarayana |
| 2012/0102412 A1 | 4/2012 | Sinclair et al. |
| 2012/0144285 A1 | 6/2012 | Bach et al. |
| 2012/0209875 A1 | 8/2012 | Hintze |
| 2012/0254045 A1 | 10/2012 | Orfano |
| 2012/0254156 A1 | 10/2012 | Rao |
| 2012/0297277 A1 | 11/2012 | King |
| 2012/0297301 A1 | 11/2012 | Mahoney |
| 2013/0024788 A1 | 1/2013 | Olsen et al. |
| 2013/0036347 A1 | 2/2013 | Eftekhari et al. |
| 2013/0086624 A1 | 4/2013 | Powell |
| 2013/0096819 A1 | 4/2013 | Tarnok |
| 2013/0185753 A1 | 7/2013 | Kliot |
| 2013/0211945 A1 | 8/2013 | Po-Ching |
| 2013/0238965 A1 | 9/2013 | Barrus |
| 2013/0297442 A1 | 11/2013 | Simons |
| 2013/0317939 A1 | 11/2013 | Urbanski |
| 2013/0318426 A1* | 11/2013 | Shu ..................... G06V 30/412 715/226 |
| 2013/0325623 A1 | 12/2013 | Balduf |
| 2013/0325665 A1 | 12/2013 | Shaffer |
| 2013/0346151 A1 | 12/2013 | Bleakley |
| 2014/0033088 A1 | 1/2014 | Shaver |
| 2014/0164255 A1 | 6/2014 | Daly |
| 2014/0164260 A1 | 6/2014 | Spieckerman |
| 2014/0236751 A1 | 8/2014 | Bloomfield |
| 2014/0380229 A1 | 12/2014 | Volodin et al. |
| 2015/0081497 A1 | 3/2015 | Patel |
| 2015/0242747 A1 | 8/2015 | Packes |
| 2015/0317701 A1 | 11/2015 | Thomas |
| 2015/0332371 A1 | 11/2015 | Lomas |
| 2018/0225593 A1 | 8/2018 | Cozine |
| 2021/0406830 A1 | 12/2021 | Allison |

OTHER PUBLICATIONS

Cechin, A. et al., "Real Estate Value at Porto Alegre City Using Artificial Neural Networks." Unisinos University, IEEE, 2000, 6 pages.

(56) References Cited

OTHER PUBLICATIONS

Herboso, F., "Simple Docusign Instructions From Herboso & Associates." <https://activerain.com/blogsview/2083565/simple-docusign-instructions-from-herboso---associates/>2011, pp. 1-7.
Kaboudan, M et al., "A three-step combined genetic programming and neural networks method of forecasting the S&P/Case-Shiller home price index." Int. Journal of Comp. Intelligence and Applications, vol. 12, No. 1, Mar. 2013, 17 pages.
Khalafallah, A., "Neural network based model for predicting housing market performance." Tsinghua Science and Technology, vol. 13, No. S1, pp. 325-328, Oct. 2008.
Rossini, P., "Application of artificial networks for the valuation of residential property." 10 pages, Jan. 1997.

* cited by examiner

FIGURE 1

PRIOR ART

SYSTEMS, METHODS AND APPARATUS FOR FORM BUILDING

CROSS-REFERENCE TO RELATED APPLICATIONS

This application is a continuation of U.S. patent application Ser. No. 16/135,282, entitled SYSTEMS, METHODS AND APPARATUS FOR FORM BUILDING, filed Sep. 19, 2018, which is a continuation of U.S. patent application Ser. No. 13/547,120 (now U.S. Pat. No. 10,108,928), entitled SYSTEMS, METHODS AND APPARATUS FOR FORM BUILDING, filed Jul. 12, 2012, which claims priority to the disclosure of U.S. Provisional Patent Application Ser. No. 61/548,281, entitled FORM BUILDER, filed Oct. 18, 2011. All of the disclosures of these applications are incorporated herein by reference in their entireties.

This application is related to U.S. patent application Ser. No. 13/547,118, entitled SYSTEMS, METHODS AND APPARATUS FOR FORM BUILDING, filed Jul. 12, 2012 (now U.S. Pat. No. 9,858,548), which is incorporated herein by reference in its entirety.

TECHNICAL FIELD

The systems and methods described below relate generally to electronic documents, and more particularly to the formation of electronic documents that can be used in electronic workflows for multi-party business transactions.

BACKGROUND

Business transactions between parties are usually formalized by signing documents that specify the terms of the agreement between the parties. The nature of the business transaction can determine the number and complexity of the documents. In real estate transactions in particular, there can be multiple different forms, signed at different times by buyers, sellers, real estate agents, and escrow agents, among others.

For example, when a seller places their home on the market for sale, the seller often signs a listing agreement with a real estate agent. When an interested buyer makes an offer on the home, the buyer can condition the offer upon a number of contingencies, such as a home inspection, the sale of the buyer's current home, and other contingencies, that become part of the offer. The seller may make counteroffers. This process may go back and forth until an agreement is reached. At that point, the agreed upon price and all of the conditions are signed by the parties and a binding contract is formed. Most of the time the parties are not in the same physical location when the offers, counteroffers, and acceptances are signed. Fax machines are often used to facilitate the process, as well as emailing scanned documents.

The seller may also sign a variety of forms relating to their home. For example, a common form for home sellers is a Lead-Based Paint Disclosure form. A hypothetical Lead-Based Disclosure form 100 is presented in FIG. 1. The form 100 includes places for buyers, sellers and agents to insert the appropriate information, for example by writing in the information by hand or typing it directly into an electronic version of the form 100 on a computer. The form 100 can include a check space 102, a selection space 104 for making a selection from a group of listed selections, a text space 106 for entering a description, initial spaces 108 for the seller's initials, the buyer's initials, and the agent's initials, and signature spaces 110 and date boxes 112 for the seller's signature and date, the buyer's signature and date, and the agent's signature and date. Sellers, buyers, and their agents are often not in the same contemporaneous physical location. Therefore, signed documents are often faxed between parties, with original signed copies being retained for the closing. In some instances, especially for important documents, two copies of the documents are signed, with one originally signed copy returned to the seller and one originally signed copy retained by the buyer.

DETAILED DESCRIPTION

Various non-limiting embodiments of the present disclosure will now be described to provide an overall understanding of the principles of the structure, function, and use of the group billing systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Traditionally, forms used in various transactions can be pre-printed paper forms, or can be forms in electronic format. Example electronic formats include Adobe Portable Document Format (PDF), Microsoft Word, Rich Text Format (RTF), or any other suitable electronic format as would be understood in the art. Forms in electronic format can be printed and information entered by hand. Some forms permit information to be entered directly into the form using, for example, a computing device or computer. For a typical business transaction, there may be multiple ways of entering information into the various forms needed to formalize the transaction, including editing text in a Word document, filling in a field of a PDF form, and signing a printed form. The presently disclosed embodiments are generally directed to systems and methods for generating or creating electronic forms.

Figure 2:
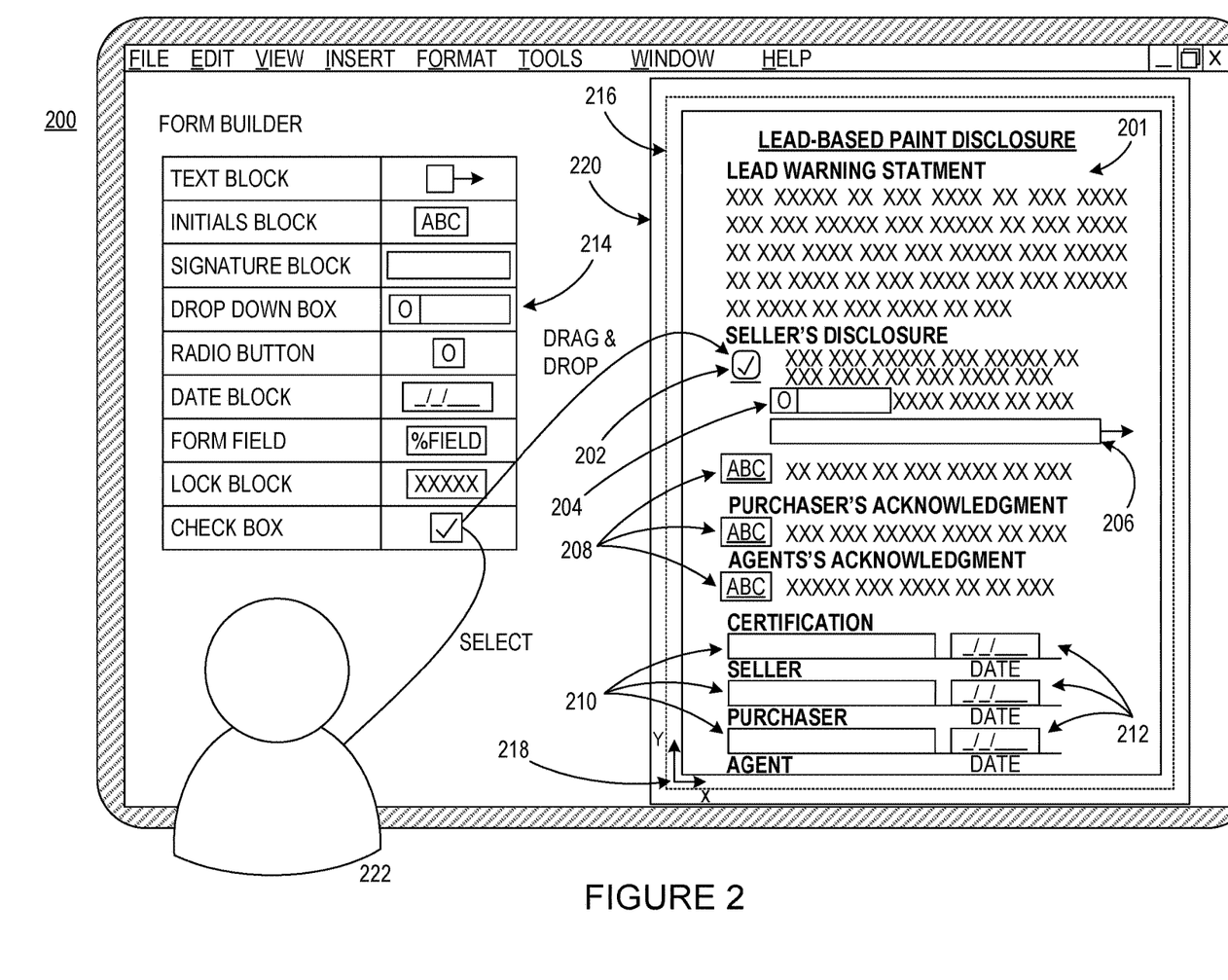
FIG. 2 is a block diagram of a form builder system, including drag and drop form elements.

Referring now to FIG. 2, a form builder system 200 makes it possible to create a reusable electronic document 220 that can be used in electronic workflows for commercial, real estate, or business transactions, among others. The form builder system 200 includes a design tool for creating the reusable electronic document 220. The form builder system 200 can include a canvas 216 area that is placed over an image or snapshot 201 of the form 100. One or more data entry fields 214 are positioned on the canvas 216 over selected areas of the snapshot of the form 100. The data entered into data entry fields 214 of the electronic document 220 can be stored separately from the form 100 in a workflow data record 310. Multiple electronic workflows for multiple separate transactions can use the same electronic document and each with have their particularized information stored in a separate workflow data record 310 without entering information into the form 100 itself.

The form builder system 200 provides a set of rules and data entry fields 214 separate from the form 100 that is suitable for electronic workflows. The form builder system 200 allows a forms-designer 222 to convert the form 100 into a set of rules and data entry fields 214, which can then be used in an electronic workflow for capturing and storing information particular to a transaction. The form 100 and the information that is captured and stored can each be stored separately. Storing the information separately, and allowing rules to be created relating to that information provides advantages. For example, information that is entered on one electronic document 220 can be auto-populated onto other related electronic documents 220 in the same transaction or electronic workflow, thereby saving time and effort of entering the same information into multiple forms. Also, information that is entered for one electronic document 220 can be used to check for errors in the information entered into another electronic document 220.

The form builder system 200 can position a canvas 216 area over a snapshot 201 of the form 100. The snapshot 201 of the form 100 can be in any supported format. For example the snapshot 201 of the form 100 can be an image such as a tagged image file format (TIFF) image, a Word document, a portable document format (PDF) file, a file containing hypertext markup language (HTML), or any other suitable format of data. In various configurations, the form builder system 200 can render the form 100 into an image file or a common format for the form builder system 200, such as a bitmap (BMP) image or an image scanned to a PDF file, or the form builder system 200 can use an existing form 100 in its native format, for example if the form 100 is a PDF or Word document. The snapshot 201 of the form 100 can also be the form 100, positioned appropriately under the canvas 216 area and resized if needed. The form builder 200 can store the form 100 in a database 300, the snapshot 201 of the form 100 in the database 300, or both. The form builder 200 can also utilize a link to the form 100, if the form is stored outside the form builder system 200.

The form builder system 200 can allow a forms-designer 222 to select and then drag and drop one or more data entry fields 214 onto the canvas 216. The canvas 216 is the area over the snapshot 201 of the form 100 where data entry fields 214 can be positioned. The canvas 216 can be separate from the snapshot 201 of the form 100. Although the canvas 216 is illustrated in FIG. 2 as smaller than the snapshot 201 of the form 100, this is for purposes of illustration only. The canvas 216 can be positioned over the snapshot 201 of the form 100 and can be, for example, the same size as the snapshot 201 of the form 100, thereby allowing the forms-designer 222 to place data entry fields 214 anywhere over the snapshot 201 of the form.

The canvas 216 can also be smaller or larger than the form 100 as desired. For example, the canvas 216 can be sized to fit within the typical margins of a page (for example, by leaving one inch at the top, bottom, and sides as non-printable area). The canvas 216 can also have a higher or lower resolution than the underlying snapshot 201 of the form 100. For example, the form 100 can be a standard letter size, or 8.5" by 11" document, that has been scanned to an image using a 100 dpi, or dot-per-inch, scanning resolution.

When viewed on the form builder system 200 at 100% zoom, the snapshot 201 of the form 100 is displayed as 850 by 1100 pixel image. The canvas 216 can be the same resolution as the snapshot 201 of the form 100 or the canvas 216 can be a higher or lower resolution. For example, the canvas 216 can use a 300 dpi resolution to allow finer control over the positions of the data entry fields 214 on the canvas 216 relative to the snapshot 201 of the form 100.

The forms-designer 222 selects a data entry field 214 and then drags and drops the selected data entry field 214 onto the canvas 216. The data entry fields 214 can also be called widgets and do not necessarily require or permit entry of data by users in the workflow. The position 218 of the placement of the data entry field 214 is stored. The position 218 can be stored, for example, as a pair of (x,y) coordinates relative to the lower left corner of the canvas 216 where the (x, y) coordinates use the resolution of the canvas 216. The position 218 can also be stored relative to the lower left corner of the snapshot 201 of the form 100, or relative to any other position in the form builder system 200. Generally, using the lower left corner of the canvas 216 and using the resolution of the canvas 216 facilitates compatibility across various different forms 100 in the form builder system 200.

The form 100 can include multiple pages and the snapshot 201 of the form 100 can also include multiple pages. If the form 100 includes multiple pages, the canvas 216 can include multiple pages or areas. The forms-designer 222 can choose to place a data entry field 214 on any one of the pages. If the form 100 includes multiple pages, the data entry field 214 can have a position 218 stored as both a page reference identifier and the (x, y) coordinates within that page.

The forms-designer 222 can provide an identifier for the selected data entry field 214, and can provide an initial default value or values for the data entry field 214. For example, as illustrated in FIG. 2, if the forms-designer 222 selects and then drags and drops a check box 202 onto the canvas, the forms-designer 222 can give that check box 202 an initial default value as unchecked (for example, using the binary number 0) and a field name such as "lead_disclosure_checkbox" or any other field name or identifier. The forms-designer 222 can generate rules for this electronic document 220 or other electronic documents 220 in the workflow. For example, the rules can check or verify whether the check box 202 has been selected and whether other data entry fields 214 in this or other electronic documents 220 have particular values, as will be described below in additional detail.

Because the data entry fields 214 are separate from the form 100, the font used in the data entry field 214 can be the same or different than the fonts in the form 100. The forms-designer 222 can pre-select the font size, or configure a rule that allows the font size to be automatically resized to fit the available space of a data entry field 214. The forms-designer 222 can size the data entry fields 214 so that they correspond to white (blank) spaces available on the form 100. The forms-designer 222 can make the data entry field 214 larger or smaller than the white spaces on the form 100, including having data entry field 214 placed over and obscuring portions of the snapshot 201 of the form 100.

The forms-designer 222 can select and then drag and drop other data entry fields 214 onto the canvas to create an electronic document 220 that can be used in a workflow. For example, the forms-designer 222 can place a drop down box 204 onto the canvas 216 for selecting one of a number of provided text responses, a text block 206 for free-form text entry, one or more initials blocks 208, signature blocks 210, and date blocks 212. Other data entry fields 214 can include radio buttons, form fields that are automatically populated by rules and that depend on entries made in other data entry fields 214 in this or other electronic documents 220 in the workflow, and locked blocks. An example of a form field (not shown) is a date block 212 associated with a signature block 210 that has a value automatically entered into the data block 212 based on the date that a user electronically signs a document by entering data into the signature block 210.

Locked blocks can be used for entering information that is not changeable by users during the workflow, and that may or may not be visible to users during the workflow. Example locked blocks include the name of the electronic document 220 or form 100 used in the electronic document 220, directory locations, version numbers, creation or edits dates and times, and information about data structures or records that correlate this electronic document 220 with other data, such as data stored in a database 300.

The forms-designer 222 can enter a data entry field 214, and for each data field 214, the form builder system 200 can record the position 218 of the data field 214 on the canvas 216 or workspace. For each data field 214, the forms-designer 222 can enter a default value or initial values into the data entry field 214, and generate one or more rules relating to the data entry field 214. The forms-designer 222 can repeat this process, with each data entry field 214 and associated information stored as a record element 306 in a form record 302. The forms-designer 222 can save the electronic document 220 and publish the electronic document 220 for use in electronic workflows.

Figure 3A:
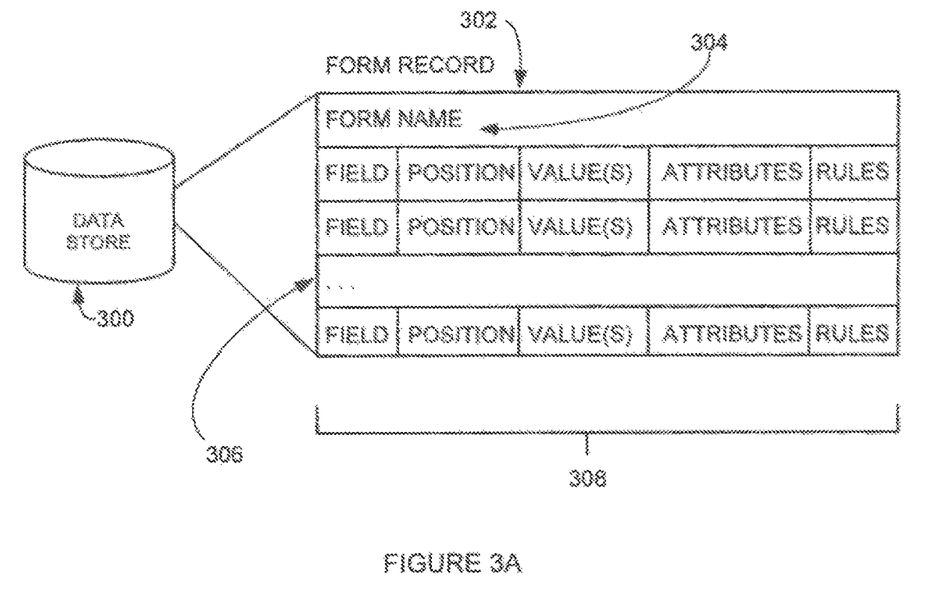
FIGS. 3A, 3B, and 3C are block diagrams of databases and data records of a form builder system.

Referring now to FIG. 3A, an example form record 302 created by the form builder system 200 is presented. FIG. 3A illustrates just one possible form record 302 that could be created by the form builder system 200. Other records, type of records, and variations are possible as would be generally understood in the art.

The form record 302 can be stored in an electronic database 300, also called a data store. Each form record 302 can include a form name 304, or record type identifier. The form name 304 identifies the electronic document 220 with which the form record 302 is associated. For example, the form record 302 can be associated with an electronic document 220 for the Lead-Based Paint Disclosure form 100 illustrated in FIG. 2.

The form record 302 can include a data structure that corresponds to the data entry fields 214 selected by the forms-designer 222. The form record 302 can include record elements 306 that correspond to each of the data entry fields 214. For example, each record element 306 can include sub-elements 308 such as the field name, the relative position of the data entry field 214 on the canvas 216, the default value or values of the data field 214, initial attributes associated with the record elements 306, and rules associated with the member element, among other sub-elements. An example field name can be "lead_disclosure_checkbox", which identifies this record element 306 with the check box 202 in FIG. 2. An example position can be the (x, y) coordinates of the relative position of the data entry field 214 on the canvas 216, and can also include a page identifier if the form 100 includes multiple pages. An example default value, or values, of the data field 214 can be a binary data, a numeric data, a date data, or a text data, which may be initially set to a default value. For example, the check box 202 of FIG. 2 initially can be set to the binary number 0 to indicate that the check box 202 is initially unchecked. The text data can also be a pointer or link to the text data, for example when the length of the text data is variable or not known the text data can be stored in a separate record in the database 300.

Initial attributes can be associated with each record element 306. Example initial attributes can include flags such as a read-only flag, a write-enable flag, and so forth. Other example attributes can include locks on the fields. For example, an initial attribute for a purchaser's initials block 208 could lock the purchaser's initials block 208. A rule can be set up to change the attribute and unlock the purchaser's initials block 208 after there is an entry in the seller's initials block 208. The purchaser's initials block 208 would be locked until a seller has first entered their initials in the seller's initials block 208. This would ensure that some entries must have data entered in a particular ordered.

Rules can be used to check values entered by users. Rules can be created in a human readable text form. The rules can also include a pointer or a link to a rule stored separately, for example in another record of the database 300, such as a rules record (not shown). This would allow easy re-use of common rules. An example rule can check the length of a text string. For example, text data can be set to a fixed number of characters, such a three text characters typical of an initials block 208. Another example rule can check whether a numbered entered into a text field is within a certain range (for example, whether the number is a positive integer), or whether a date entered occurs within a certain period of time (for example, to make sure a future or past date in not accidentally entered by mistake). Rules can be used to lock all of, or portions of, a record. An example rule for locking a portion of a record is a rule that once the seller has entered their initials into the seller's initials block 208 then the "lead_disclosure_checkbox" check box 202 is locked for all users and cannot be later changed.

Rules can also check whether any of the information entered by the user can be used to autopopulate other fields, or the information entered needs to be checked against other information previously entered elsewhere on this or another electronic document 220. For example, when a new electronic document 220 is selected in an electronic workflow, previously entered information for the seller and purchaser can be automatically entered into the new electronic document 220 thereby saving time for the users. The user can also be prompted to allow the information to be automatically entered. In another example, if the user attempts to modify a field, then all identically named fields in other documents can similarly be modified, or again the user can be prompted to permit the modification. For example, if the user was previously identified in an electronic document 220 by an informal name, such as a nickname, all electronic documents 220 can be updated at once when the user's correct legal name is entered into one of the electronic documents 220.

A user, such as a realtor, a purchaser, a seller, or other party, can use an electronic document 220 in a workflow and enter information into the data entry fields 214. When the user selects an electronic document 220 in the workflow, a workflow data record 310 is created that corresponds to the data entry fields 214 in the electronic document 220 and a corresponding form record 302. An example workflow data record 310 is presented in FIG. 3B. The workflow record name 312 identifies the particular instance of the electronic document 220 that is being used in the workflow by the user. As described for FIG. 3A, other records, type of records, and variations are possible as would be generally understood in the art. For example, in another configuration, a separate identifier outside of the workflow data record 310 can be used to associate a form record 302 with an electronic workflow. The workflow data record 310 can include record elements 306 that correspond to all or some of the data entry fields 214. For example, each record element 306 can include sub-elements 308 such as a field name, a value or values of the data field 214 to be entered by users (that can be populated with a default value), and an attribute or attributes associated with the record element 306 as described above for initial attributes.

Figure 3B:
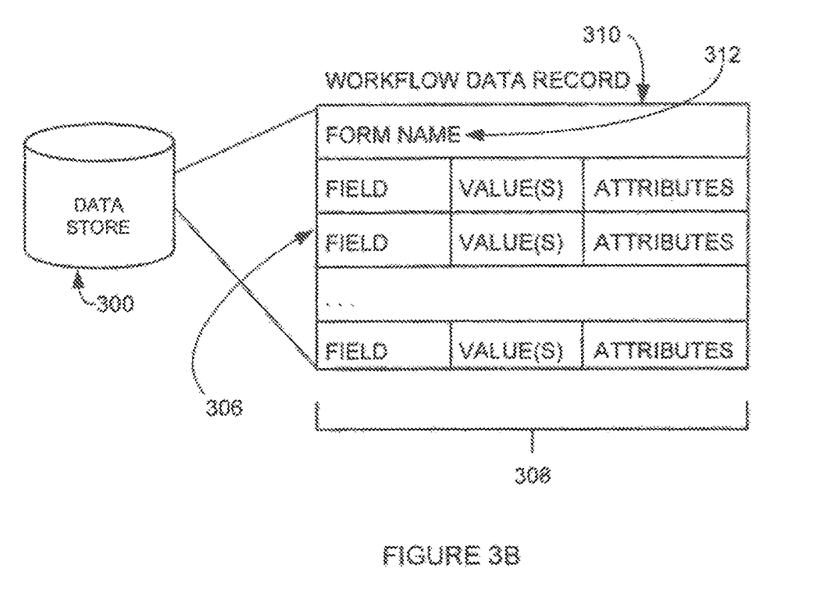

When a user enters information or data into one of the data fields 214 of the electronic document 220, the workflow system checks the rules and attributes associated with the particular record element 306 that is associated with a data field 214 in the form record 302. If the workflow system determines that the user is allowed to change a value in the particular record element 306, then the workflow system updates the value in the record element 306 associated with the data field 214 in the workflow data record 310. Note that the value entered may be checked or modified by other rules from the form record 302. For example, during a workflow, an electronic document 220 can be sent back and forth between users. Depending upon which user is accessing the electronic document 220, the user may only be allowed to change some data field 214 but not other data field 214. For example, in the case of the Lead-Based Disclosure Form of FIG. 2, only the seller or the agent may be able to modify "lead_disclosure_checkbox" check box 202, and only the seller could modify the data field 214 associated with the seller's initials, namely the seller's initials block 208. A user who is not authorized to modify or enter a value into one of the data fields 214 may be presented an indication that they are not authorized, such as graying out of particular data entry fields 214, or the user may receive an error message if the user attempts to modify the particular data entry field 214.

Figure 3C:
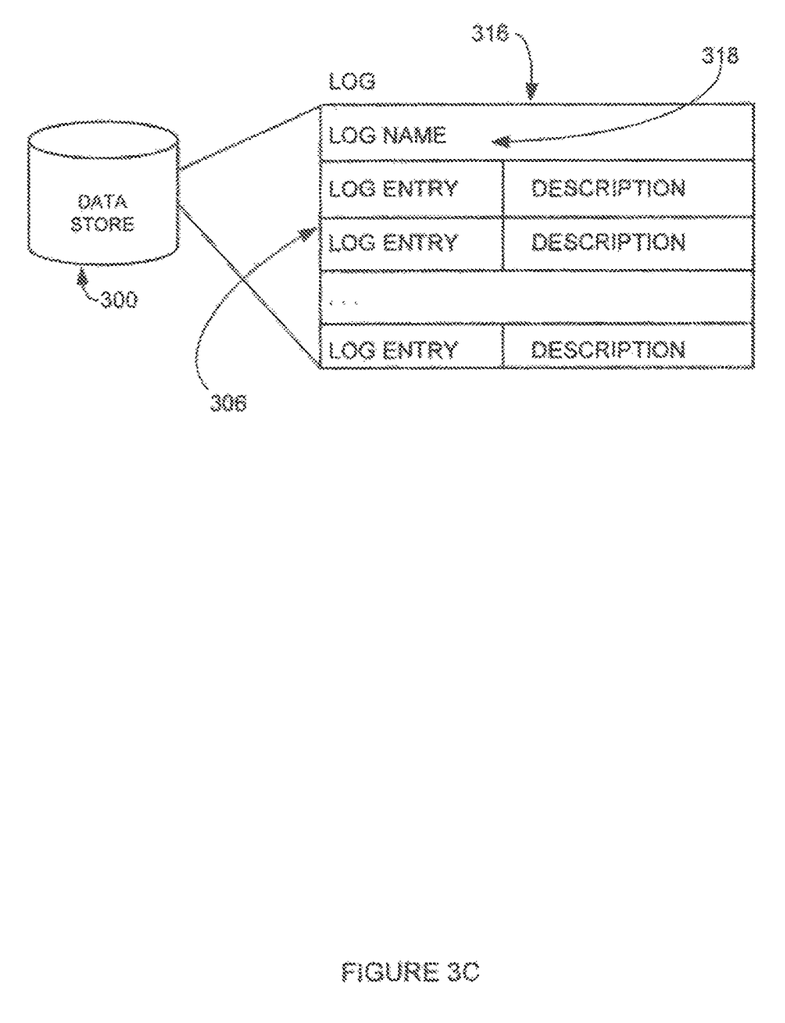

Additional attributes can include a time and date stamp of when the information in the data field 214 or the record element 306 was last updated, as well as an identification of the user that updated the information. Additionally, for each record 302, 310, or for a group of records 310 in an electronic workflow, there can be one or more associated log files 316. An example log file 316 is presented in FIG. 3C. A log file 316 can be associated with an electronic document 220 or a workflow by the log name 318, or log record type identifier. A log file 316 can record changes to the electronic document 220 by the forms-designer 222 or can record entries made by users into the electronic document 220. Note that entries into the electronic document 220 can be performed by users or can be autopopulated by rules. The log file 316 can be used to certify the entry of data by users, determine which entries were made by rules, and to perform error checking.

Figure 1:
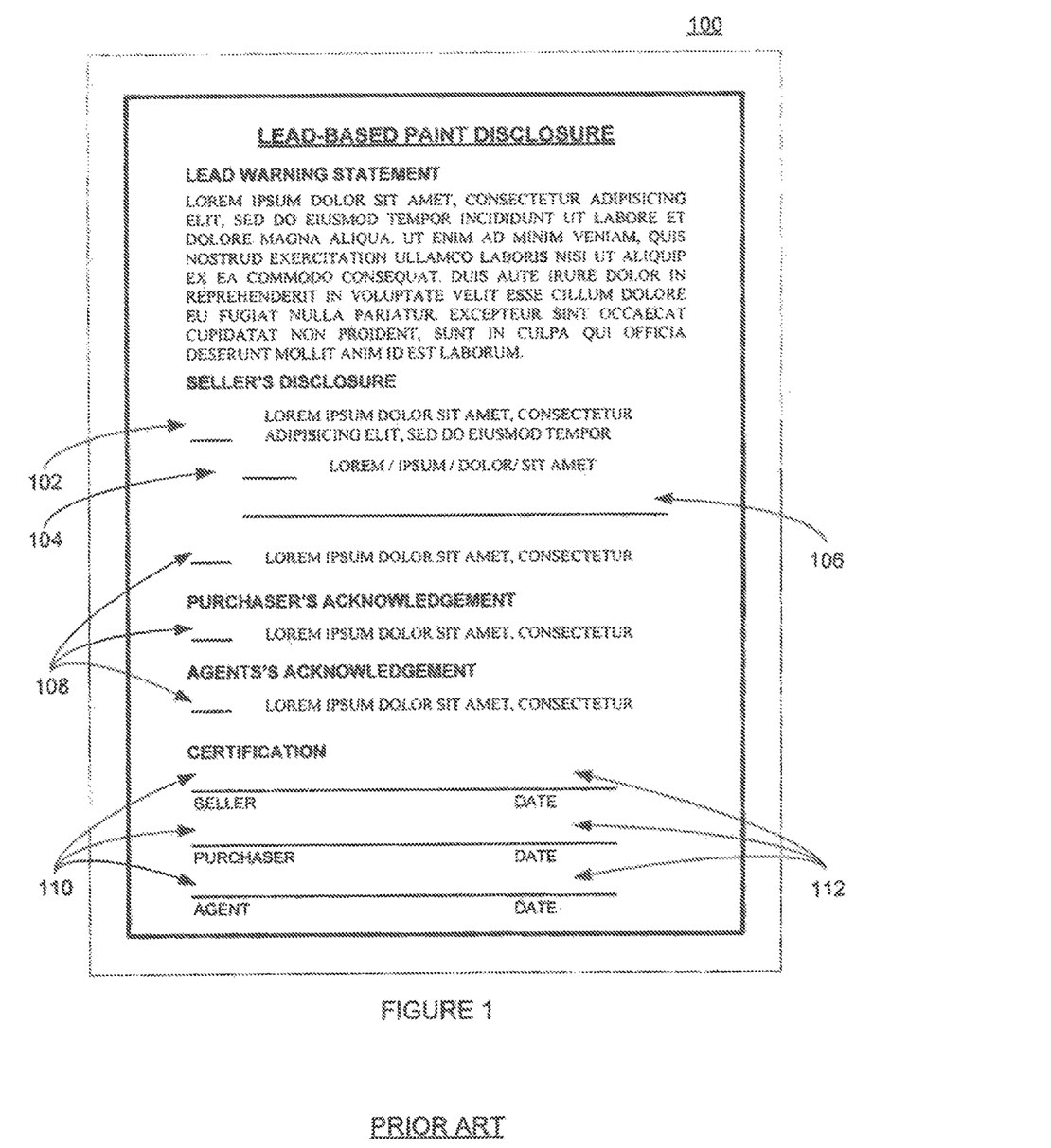
FIG. 1 is a plan view of an example form for manually entering data.
Figure 4:
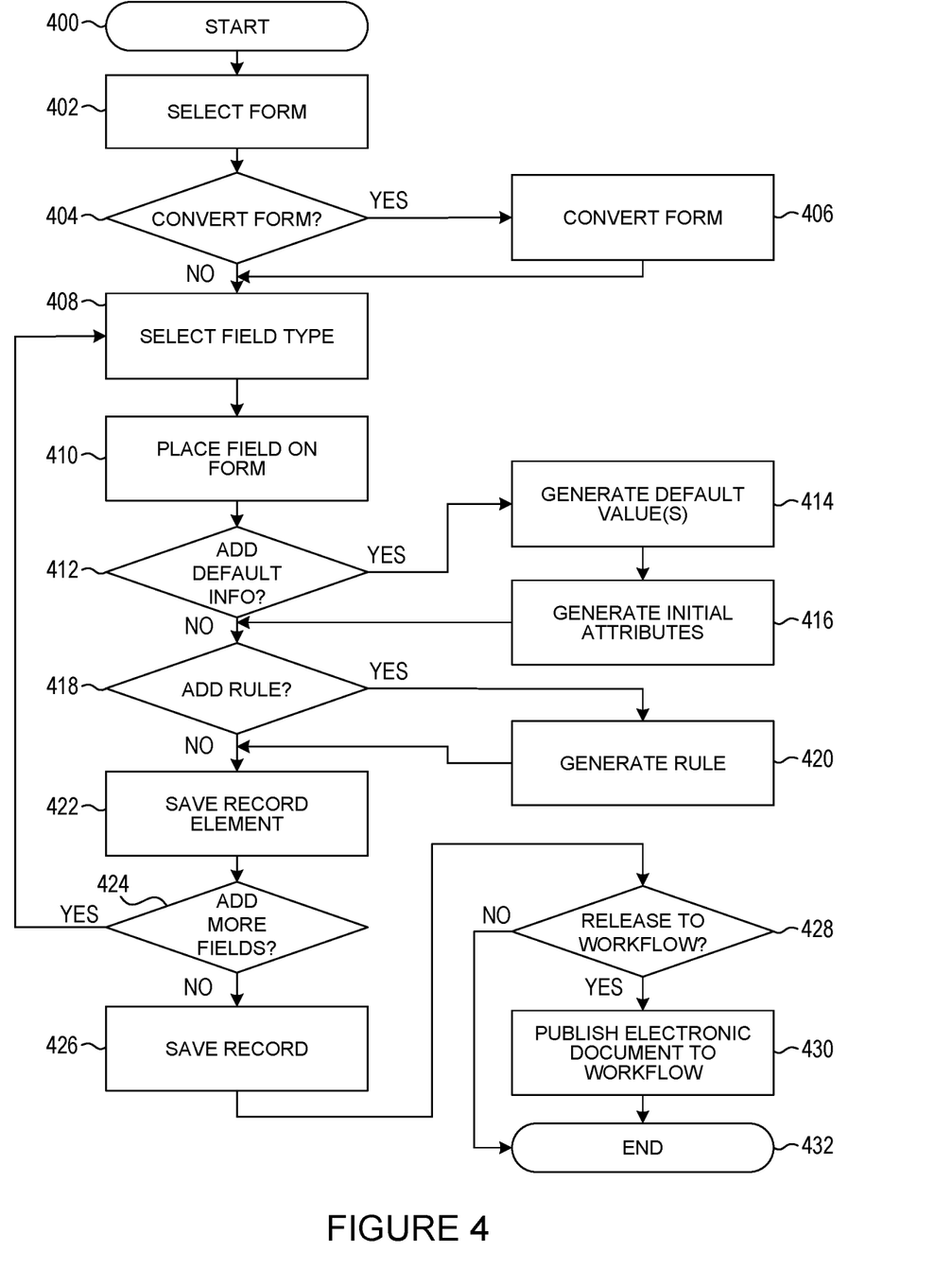
FIG. 4 is a flow diagram of a method of creating an electronic document using a form builder system.

Referring now to FIG. 4, an exemplary flowchart of the operation of the form builder system 200 is presented. Operation starts with start block 400 labeled START. Processing continues to process block 402 where a form 100 is selected. As described above, the form 100 can be any kind of form 100 used in a transaction, for example a Lead Disclosure Form as illustrated in FIG. 1. The form can be a single page form 100 or the form 100 can include multiple pages. Processing continues to decision block 404.

In decision block 404, the form builder system 200 may need to convert the format of the form 100 from the native format of the form 100 to a format usable by the form builder system 200 in order to use the form. Alternatively, the form builder system 200 may need to render the form 100 from the native resolution to a higher or lower resolution. Or the form builder system 200 may be able to use the form 100 in the current format without modification as the snapshot 201 of the form 100. If the form builder system 200 needs to convert the form 100, processing continues first to process block 406 before continuing to process block 408, otherwise processing continues to process block 408.

In process block 406, the form is converted to a format for use by the form builder 200 system as the snapshot 201 of the form 100. For example, the form builder system 200 may store all forms in PDF format. In this case, the forms-designer 222 can scan the form 100 to a PDF file. In various configurations, the form 100 can be scanned to a desired format, printed to a desired format, rendered to a desired format, or otherwise image processed to the desired format. The resolution of the form 100 may also be changed. Processing continues to process block 408.

In process block 408, the forms-designer 222 select a data entry field 214 to be placed over the snapshot 201 of the form in the canvas 216 area. The data entry field 214 can be a check box 202, drop down box 204, a text block 206, an initials block 208, a signature block 210, a date block 212, a radio button, a form fields, a locked block, or any other kind of data entry field 214 that would be understood by one familiar in the art. Once the forms-designer 222 selects the data entry field 214, processing continues to process block 410.

In process block 410, the forms-designer 222 moves the selected data entry field over to the snapshot 201 of the form 100 and positions the selected data entry field 214 in the canvas 216 area. The selected data entry field 214 can be resized and repositioned. The forms-designer 222 can place the selected data entry field 214 so that it aligns with a specific place on the snapshot 201 of the form 100. For example, the selected data entry field can be placed and resized on the canvas so that it corresponds with a whitespace area of the form where a user would normally enter data. This placement of the selected data entry field 214 would provide a user of this electronic document in a workflow environment with the perception that they were actually entering data directly into the document and would be a desirable effect. Once the forms-designer 222 places the selected data entry field 214, processing continues to decision block 412.

In decision block 412, if the forms-designer 222 adds default information associated with the selected data entry field 214, processing continues to process block 414 and then to process 416 before continuing to decision block 418, otherwise processing continues to decision block 418.

In process block 414, the forms-designer 222 adds default values to the selected data entry field 214. For example, if the selected data entry field 214 is a check box 202, the default value can be a binary 0 or a binary 1 indicating, for example, that the check box 202 defaults to be checked or unchecked. Processing continues to process block 416. In process block 416, the forms-designer 222 adds initial attributes, as described above, for the selected data entry field 214. For example, the initial attributes can include flags that indicate that only the selling party, or seller, can change the value of the selected data entry field 214. Processing continues to decision block 418.

In decision block 418, if the forms-designer 222 adds a rule associated with the selected data entry field 214, processing continues to process block 420 before continuing to process block 422, otherwise processing continues to process block 422.

In process block 420, the forms-designer 222 can add a rule associated with the selected data entry field 214 as described above. For example, the forms-designer 222 can add a rule that checks whether some previous data entry field 214, such as a check box 202, has been selected prior to allowing the user to enter data into the selected data entry field 214. Processing continues to process block 422.

In process block 422, the record element 306 associated with the selected data entry field 214 is saved in the database 300. The record element 306 can include the selected data entry field 214, position of the selected data entry field 214, default values, initial attributes, and rules associated with the selected data entry field 214. Processing continues to decision block 424.

In decision block 424, if the forms-designer 222 has additional data entry fields 214 to place on the snapshot 201 of the form 100 then processing continues back to process block 408 and a new data entry field 214 is selected. Otherwise, processing continues to process block 426.

In process block 426, the form record 302 is saved to the database 300. The form record 302 includes the record elements 306 from process blocks 408 through 422. The form record 302 can include a form name 304 that can associate the form record 302 with the form 100. An electronic document 220 includes the form record 302 and the snapshot 201 of the form 100. Processing continues to decision block 428.

In decision block 428, if the forms-designer 222 releases the electronic document 220, then processing continues to process block 430, otherwise operation concludes with end block 432 labeled END.

In process block 430, the forms-designer 222 releases the electronic document 220 for use in electronic workflows. Operation then concludes with end block 432 labeled END.

Figure 5:
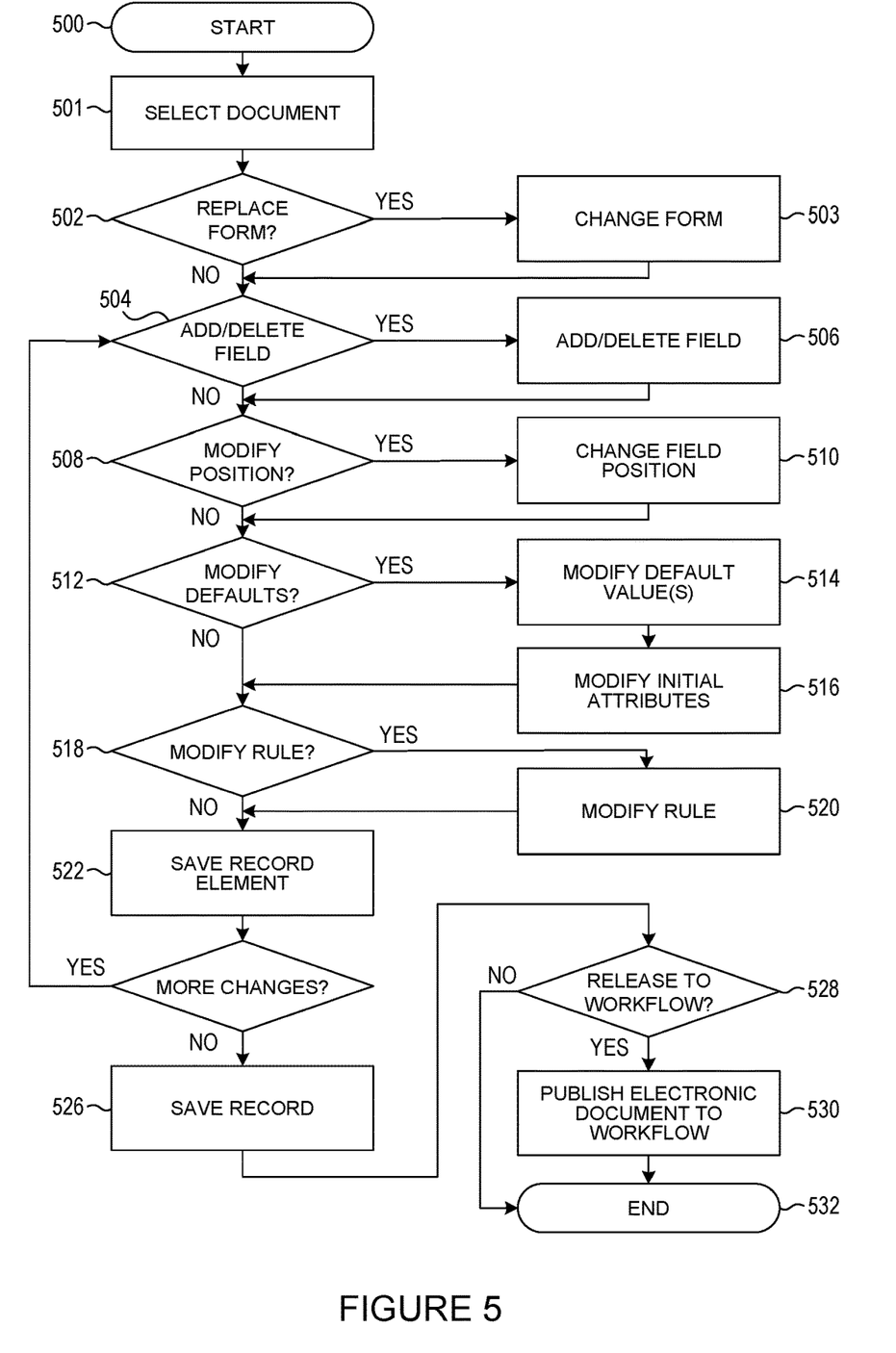
FIG. 5 is a flow diagram of a method of modifying an electronic document using the form builder system.

Referring now to FIG. 5, an exemplary flowchart of the operation modifying an existing electronic document in the form builder system 200 is presented. Operation starts with start block 500 labeled START. Processing continues to process block 501 where an existing electronic document 220 is selected. Processing then continues to decision block 502.

In decision block 502, if the forms-designer 222 replaces the current snapshot 201 of the form 100 in the electronic document 220, then processing continues to process block 503 before continuing to decision block 504, otherwise processing continues to decision block 504.

In process block 503, the forms-designer 222 replaces the current snapshot 201 of the form 100 with another snapshot 201 of a form 100. For example, the forms-designer 222 could be replacing the current form 100 with a better resolution version of the same form 100. The forms-designer 222 could be replacing the current form 100 with an updated form. It is well known that forms 100 can change over time and need to be replaced with more up-to-date forms 100. The forms-designer 222 could also be using an existing electronic document 220 as a template for building a new electronic document 220. In this case, many of the data entry fields 214 may be the same and using an existing electronic document 220 as a template can save considerable time for the forms-designer 222. Data entry fields 214 may need to be added, deleted, or moved depending on the new form 100. The form builder system 200 need to convert the format of the form 100 from the native format of the form 100 to a format usable by the form builder system 200 in order to use the form 100 or the form 100 may be usable in the native format as described for the operation of the form builder system 200 in FIG. 4. The forms-designer 222 updates or replaces the snapshot 201 of the form 100 using the new or updated form 100. Processing continues to decision block 504.

In decision block 504, if the forms-designer 222 adds a new data entry field 214, the processing continues to process block 506 before continuing to decision block 508, otherwise processing continues to decision block 508.

In process block 506, the forms-designer 222 can add new data entry field 214 to the canvas 216 as described for the operation of the form builder system 200 in blocks 408 through 420 of FIG. 4. The forms-designer 222 can delete existing data entry fields 214. Deleting an existing data entry field 214 removes the corresponding record element 306 from the form record 302. Processing continues to decision block 508.

In decision block 508, if the forms-designer 222 repositions a data entry field 214 processing continues to process block 510 before continuing to decision block 512, otherwise processing continues to decision block 512.

In process block 510, the forms-designer 222 repositions the data entry field 214 on the canvas 216 area. Note that if the form 100 has changed, multiple data entry fields 214 may need to be repositioned over the snapshot 201 of the form 100. The data entry field 214 can also be resized. Once the forms-designer 222 repositions the data entry field 214, processing continues to decision block 512.

In decision block 512, if the forms-designer 222 adds, deletes, or modifies default information associated with the selected data entry field 214, processing continues to process block 514 and then to process 516 before continuing to decision block 518, otherwise processing continues to decision block 518.

In process block 514, the forms-designer 222 adds, deletes, or modifies default values of the data entry field 214. In process block 516, the forms-designer 222 adds, deletes, or modifies initial attributes of the data entry field 214. Processing continues to decision block 518.

In decision block 518, if the forms-designer 222 adds, deletes, or modifies a rule associated with the data entry field 214, processing continues to process block 520 before continuing to process block 522, otherwise processing continues to process block 522.

In process block 520, the forms-designer 222 can add, delete, or modify a rule associated with the data entry field 214 as described above. Processing continues to process block 522.

In process block 522, the record element 306 associated with the new data entry field 214 or modified data entry field 214 is saved in the database 300. The record element 306 can include the new or modified data entry field 214, the modified position of the data entry field 214, default values, the modifications to the initial attributes, and modifications to the rules associated with the data entry field 214. Modifications can be logged in a log file 316 associated with the form record 302. Processing continues to decision block 524.

In decision block 524, if the forms-designer 222 has additional changes to the data entry fields 214 then processing continues back to process block 504. Otherwise, processing continues to process block 526.

In process block 526, the form record 302 is saved to the database 300. The form record 302 includes the new record elements 306 and modified record elements from process blocks 504 through 522. The form record 302 can include a form name 304 that can associate the form record 302 with the form 100. An electronic document 220 includes the form record 302 and the snapshot 201 of the form 100. The changes can be logged in a log file 316. Processing continues to decision block 528.

In decision block 528, if the forms-designer 222 releases the electronic document 220, then processing continues to process block 530, otherwise operation concludes with end block 532 labeled END.

In process block 530, the forms-designer 222 releases the modified electronic document 220 for use in electronic workflows. The modified electronic document 220 is generally released as a new electronic document 220. In releasing the modified electronic document 220, the forms-designer 530 can mark the previous electronic document 200 as being obsolete or make it unavailable for use in future electronic workflows. Operation then concludes with end block 532 labeled END.

The form builder system 200 can include software modules, processes, application programming interfaces or APIs, drivers, helper applications such as plug-ins, databases such as search and query databases, and other types of software modules or computer programming as would be understood in the art. The form builder system 200 can include hardware modules such as a database 300 or data store, computing resources, and network and communication interfaces. The modules can be networked together or share a common data bus. Data can be encrypted or protected from unauthorized access. The database can be a memory or storage device including, but not limited to random access memory (RAM) such as dynamic RAM (DRAM), static ram (SRAM), flash memory, disk drives, hard drives, redundant array of individual disks or RAID drives, virtual drives, networked drives and memory available using cloud computing. The computing resources can include physical components, for example processing units such as CPUs, multi-processing units, reduced instruction set computers (RISC), processors that have pipelines, complex instruction set computers (CISC), or digital signal processors (DSP). The computing resources can also include distributed computing devices, cloud computing resources, and virtual computing resources in general. Network and communication interfaces can include any suitable physical device and protocol including, but not limited to, wired data transmission links such as Ethernet and TCP/IP or PSTN communications links such as T1s or better, ISDN, Digital Subscriber Line (DSL), or dialup modems running a point-to-point protocol or PPP. The network and communication interfaces can also include wireless protocols including cellular network providers, for example Code Division Multiple Access (CDMA) and Global System for Mobile Communications (GSM) providers.

Figure 6:
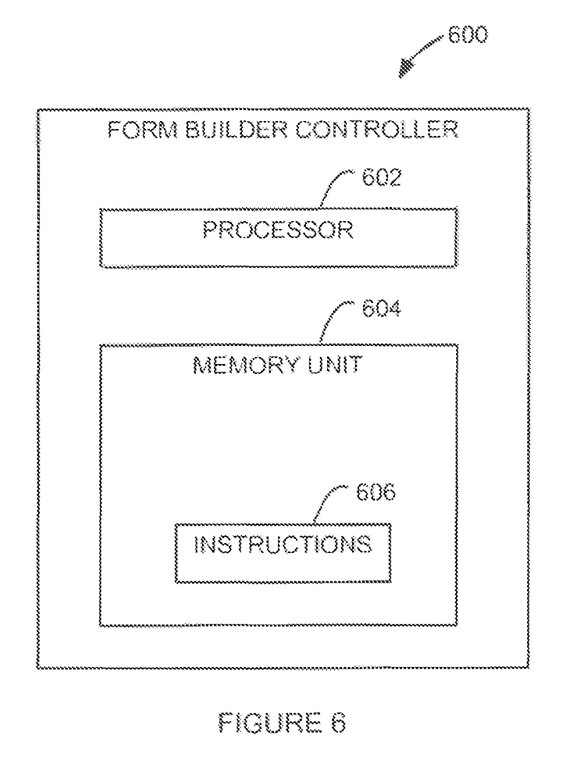
FIG. 6 is an example embodiment of a form builder controller.

FIG. 6 shows one example embodiment of a form builder controller 600 (which may be used to execute the form builder system 200 in FIG. 2) that receives and processes form information. The form builder controller 600 may be provided using any suitable processor-based device or system, such as a personal computer, laptop, server, mainframe, or a collection (e.g., network) of multiple computers, for example. The form builder controller 600 may include one or more processors 602 and one or more computer memory units 604. For convenience, only one processor 602 and only one memory unit 604 are shown in FIG. 6. The processor 602 may execute software instructions 606 stored on the memory unit 604. The processor 602 may be implemented as an integrated circuit (IC) having one or multiple cores. The memory 604 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example. Data used by the form builder controller 600 may be from various sources, such as database 300 (FIGS. 3A-3C), for example.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method, the method comprising:
   receiving a snapshot of a form;
   converting the snapshot of the form into a form record data structure, wherein converting the snapshot of the form into the form record data structure includes:
      for at least one data entry field in the form, creating a set of record elements for the form record data structure comprising an identifier of the at least one data entry field and at least one rule associated with the at least one data entry field; and
      storing the set of record elements in the form record data structure separate from the snapshot of the form;
   associating the form record data structure with an electronic document type;
   receiving a user request to create a new document of the electronic document type;
   instantiating the new document, wherein instantiating the new document includes generating a new data entry field of the new document based on an identified at least one record element stored in the form record data structure associated with the electronic document type;
   receiving a user input to the new data entry field;
   applying, to the user input, the at least one rule associated with the identified at least one record element; and
   performing one or more actions based on the application of the at least one rule to the received user input.

2. The computer-implemented method of claim 1, wherein the snapshot of the form has a file format, wherein the file format is a tagged image file format image, a word processing document, a portable document format file, or a hyper-text markup language file.

3. The computer-implemented method of claim 1, wherein a record element in the set of record elements further includes an initial value for a respective data entry field.

4. The computer-implemented method of claim 1, wherein a record element in the set of record elements further includes a field name sub-element, a relative position sub-element, and an initial attribute sub-element.

5. The computer-implemented method of claim 4, wherein the initial attribute sub-element can include an attribute rule associated with an attribute of the record element.

6. The computer-implemented method of claim 1, wherein a record element in the set of record elements further includes a time and date stamp element associated with a last update of the record element, an identity element associated with a user who last updated the record element, a log file element associated with one or more changes made to the record element, or any combination thereof.

7. The computer-implemented method of claim 1, wherein the one or more actions include auto-populating a second data entry field based on the application of the rule, checking the user input against a second value, locking or unlocking a portion of the new document, or checking whether a user is allowed to change a value of the new data entry field.

8. A non-transitory computer-readable medium comprising instructions that, when executed by one or more processors, cause the one or more processors to perform a process, the process comprising:
   receiving a snapshot of a form;
   converting the snapshot of the form into a form record data structure, wherein converting the snapshot of the form into the form record data structure includes:
      for at least one data entry field in the form, creating a set of record elements for the form record data structure comprising an identifier of the at least one data entry field and at least one rule associated with the at least one data entry field; and
      storing the set of record elements in the form record data structure separate from the snapshot of the form;
   associating the form record data structure with an electronic document type;
   receiving a user request to create a new document of the electronic document type;
   instantiating the new document, wherein instantiating the new document includes generating a new data entry field of the new document based on an identified at least one record element stored in the form record data structure associated with the electronic document type;
   receiving a user input to the new data entry field;
   applying, to the user input, the at least one rule associated with the identified at least one record element; and
   performing one or more actions based on the application of the at least one rule to the received user input.

9. The non-transitory computer-readable medium of claim 8, wherein the snapshot of the form has a file format, wherein the file format is a tagged image file format image, a word processing document, a portable document format file, or a hyper-text markup language file.

10. The non-transitory computer-readable medium of claim 8, wherein a record element in the set of record elements further includes an initial value for a respective data entry field.

11. The non-transitory computer-readable medium of claim 8 wherein a record element in the set of record elements further includes a field name sub-element, a relative position sub-element, and an initial attribute sub-element.

12. The non-transitory computer-readable medium of claim 11, wherein the initial attribute sub-element can include an attribute rule associated with an attribute of the record element.

13. The non-transitory computer-readable medium of claim 8, wherein a record element in the set of record elements further includes a time and date stamp element associated with a last update of the record element, an identity element associated with a user who last updated the record element, a log file element associated with one or more changes made to the record element, or any combination thereof.

14. The non-transitory computer-readable medium of claim 8, wherein the one or more actions include auto-populating a second data entry field based on the application of the rule, checking the user input against a second value, locking or unlocking a portion of the new document, or checking whether a user is allowed to change a value of the new data entry field.

15. A computing system, the computing system comprising:
one or more processors; and
a computer-readable medium comprising instructions that, when executed by the one or more processors, cause the one or more processors to perform a process, the process comprising:
receiving a snapshot of a form;
converting the snapshot of the form into a form record data structure, wherein converting the snapshot of the form into the form record data structure includes:
for at least one data entry field in the form, creating a set of record elements for the form record data structure comprising an identifier of the at least one data entry field and at least one rule associated with the at least one data entry field; and
storing the set of record elements in the form record data structure separate from the snapshot of the form;
associating the form record data structure with an electronic document type;
receiving a user request to create a new document of the electronic document type;
instantiating the new document, wherein instantiating the new document includes generating a new data entry field of the new document based on an identified at least one record element stored in the form record data structure associated with the electronic document type;
receiving a user input to the new data entry field;
applying, to the user input, the at least one rule associated with the identified at least one record element; and
performing one or more actions based on the application of the at least one rule to the received user input.

16. The computing system of claim 15, wherein the snapshot of the form has a file format, wherein the file format is a tagged image file format image, a word processing document, a portable document format file, or a hypertext markup language file.

17. The computing system of claim 15, wherein a record element in the set of record elements further includes an initial value for a respective data entry field.

18. The computing system of claim 15, wherein a record element in the set of record elements further includes a field name sub-element, a relative position sub-element, and an initial attribute sub-element.

19. The computing system of claim 15, wherein a record element in the set of record elements further includes a time and date stamp element associated with a last update of the record element, an identity element associated with a user who last updated the record element, a log file element associated with one or more changes made to the record element, or any combination thereof.

20. The computing system of claim 15, wherein the one or more actions include auto-populating a second data entry field based on the application of the rule, checking the user input against a second value, locking or unlocking a portion of the new document, or checking whether a user is allowed to change a value of the new data entry field.

* * * * *